United States Patent [19]

Kolb

[11] Patent Number: 4,827,285

[45] Date of Patent: May 2, 1989

[54] CONTINUOUS INK JET PRINTER HAVING ORIFICE PLATE FLEXURE STIMULATION

[75] Inventor: Ronald E. Kolb, Beavercreek, Ohio

[73] Assignee: Eastman Kodak Company, Rochester, N.Y.

[21] Appl. No.: 239,357

[22] Filed: Sep. 1, 1988

[51] Int. Cl.[4] .............................................. G01D 15/10

[52] U.S. Cl. .................................. 346/75; 346/140 R

[58] Field of Search .............................. 346/75, 140 R

[56] References Cited

U.S. PATENT DOCUMENTS 4,245,227 1/1981 Krause ................................. 346/75

4,646,104 2/1987 Braun ................................. 346/1.1

*Primary Examiner*—E. A. Goldberg

*Assistant Examiner*—Gerald E. Preston

*Attorney, Agent, or Firm*—John D. Husser

[57] ABSTRACT

An improved drop stimulation system for a continuous ink jet printer includes a generally rectangular orifice plate with orifices along a central, longitudinal axis and transducer members coupled to longitudinal edge regions of the orifice plate, equidistantly from the central axis. The transducers are actuatable to flex the orifice plate alternately concave and convex about its central axis.

3 Claims, 3 Drawing Sheets

Fig. 3
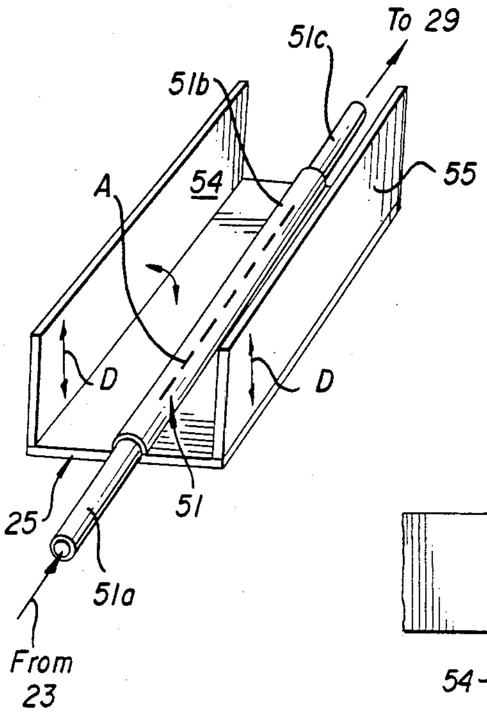
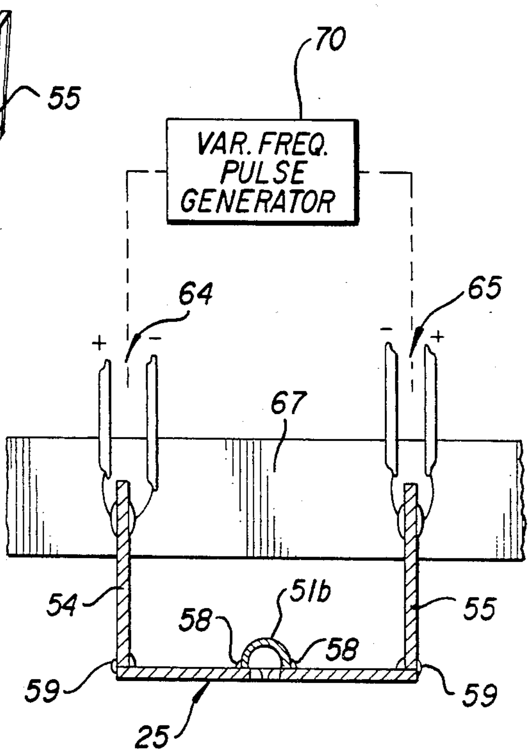
Fig. 4
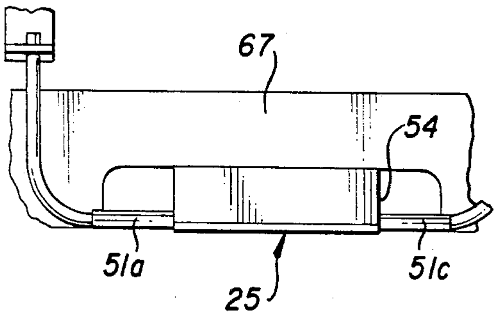
Fig. 5

CONTINUOUS INK JET PRINTER HAVING ORIFICE PLATE FLEXURE STIMULATION

FIELD OF INVENTION

The present invention relates to droplet stimulation systems for continuous ink jet printers and more particularly to stimulation systems which impart periodic energy pulses to an orifice plate to effect synchronous drop formations from a plurality of ink streams.

BACKGROUND OF INVENTION

In ink jet printing of the continuous type, various techniques have been utilized to impress regularity on the break up of ink jet filaments issuing from the print head orifices. The use of vibrational energy of predetermined frequency is a common way to create uniformity in size and spacing of the droplets that form from the ink filaments. Such energy has been applied to the ink reservoir above the orifice plate or directly to the ink in such reservoir or to the orifice plate itself.

A relatively constant break-off point is highly desirable to effect reliable drop charging so that charged drops will be properly deflected to a catch or print trajectory. Where the printer system employs a plurality (an array) of orifices, it is particularly desirable that the break off of the various issuing filaments occur synchronously (i.e. that the drop streams are substantially in phase). This reduces the size of the "window" along the drop-path-length in which drop charging must occur and thus simplifies the printer structurally and electrically.

One highly useful system for imposing periodic vibrations to the drop streams is described in U.S. Pat. No. 4,646,104, which employs a pair of piezoelectric strips mounted on opposing longitudinal sides of a resonator block having: (i) a generally homogeneous composition and (ii) a resonant frequency approximately equal to the desired drop frequency. The strips are approximately perpendicular to the strips' orifice plate that is mounted on one end of the resonator block and are energized to expand and contact in unison along their length direction. In response, the resonator block vibrates to oscillate the orifice plate between substantially parallel planes that are normal to the longitudinal axis of the resonator. This "salt-shaker" type movement of the orifice plate creates reliable, in phase, break up of the ink filaments issuing from the orifices.

Although the above-mentioned system functions very well, it has the disadvantage of requiring a tuned resonant body construction. Also, particular systems are designed to operate respectively about a specific nominal drop frequency. Thus, the range of operable drop frequencies for a printer that employs a resonator of this type is limited.

SUMMARY OF THE INVENTION

One important purpose of the present invention is to provide, for continuous ink jet printers, a synchronous drop stimulation system which overcomes the above-noted limitations of prior art systems. In addition to the advantages of reducing fabrication complexity and increasing operating drop frequency range, the present invention offers advantage from the viewpoints of reduced physical size and weight of its stimulation system embodiments. A further and significant advantage of the present invention is that stimulation can be effected synchronously at substantially different frequencies in a manner providing selectively different drop sizes, respectively at such different frequencies.

In one aspect, the present invention constitutes in a continuous ink jet printer, an improved drop stimulation system comprising: (a) a rectangular orifice plate having a linear array of orifices along a central axis; (b) first and second electromechanical transducers that are attached to first and second regions of the orifice plate and located equidistantly on opposite sides of the central axis for flexing the orifice plate alternately concave and convex about its central axis; (c) means for supplying ink under pressure to issue as jets from the orifices; and (d) means for the actuating transducers to simulate the ink jets at a predetermined frequency.

In a further aspect the actuator is operable selectively at different predetermined frequencies to vary the drop sizes of the synchronous ink jet streams.

BRIEF DESCRIPTION OF THE DRAWINGS

The subsequent description of preferred embodiments of the invention refers to the accompanying drawings wherein:

FIG. 3 is a perspective view of a portion of the FIG. 2 print head assembly further illustrating a preferred embodiment of the present invention;

FIG. 4 is an end cross section view of a portion of the FIG. 2 print head assembly further illustrating the FIG. 3 embodiment of the invention;

FIG. 5 is a side view of the structure shown in FIG. 4;

DETAILED DESCRIPTION OF THE PREFERRED EMBODIMENTS

Figure 1:
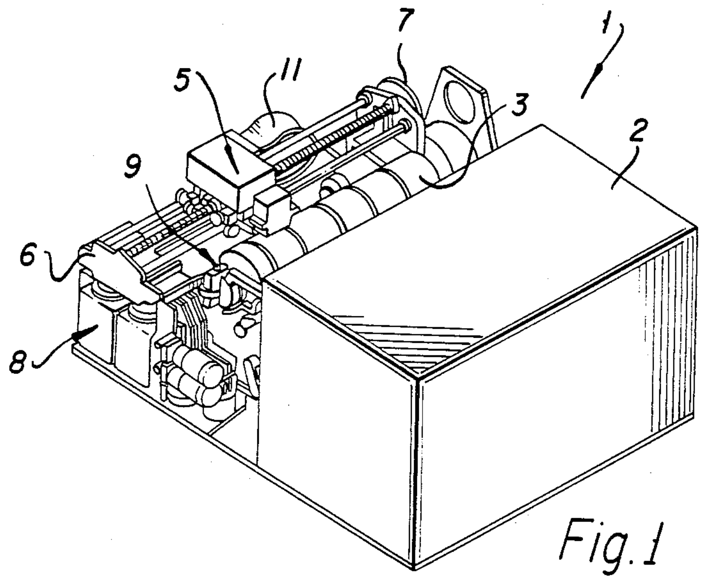
FIG. 1 is a perspective view of a continuous ink jet printer of one type which can embody the present invention.

FIG. 1 illustrates schematically an exemplary ink jet printing apparatus 1 of one type that can advantageously utilize the present invention. In general, the apparatus 1 comprises a paper feed and return sector 2 from which sheets are transported into and out of operative relation on printing cylinder 3. The detail structure of the sheet handling components do not constitute a part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to ink cartridge 8. A storage and start-up station 9 is constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the operative cycle of apparatus 1 as will be described subsequently.

Figure 2:
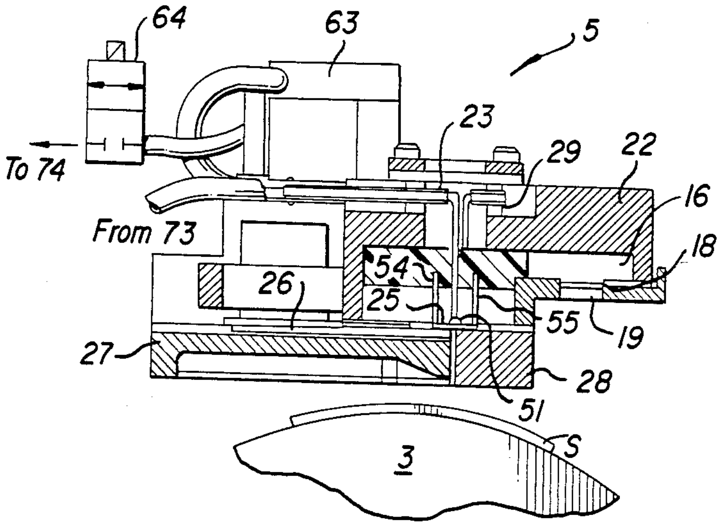
FIG. 2 is an enlarged cross section of the print head assembly of FIG. 1 printer showing one embodiment of the present invention.

Referring to FIG. 2, one embodiment of the FIG. 1 print head assembly 5 can be seen in more detail. The assembly 5 includes an upper print head portion having an inlet 23 for receiving ink and an outlet 29 leading to an ink circulation system of apparatus 1. The upper print head portion also includes an orifice plate 25 and transducer means 54, 55 for imparting mechanical flexure to the orifice plate 25, as will be described subsequently in more detail.

The lower portion of print head assembly includes a charge plate 26 constructed to impart desired charge upon ink droplets at the point of filament breakup and a drop catcher configuration 27 that is constructed and located to catch non-printing droplets (in this arrangement charged droplets). Exemplary preferred charge plate constructions are disclosed in U.S. Pat. No. 4,560,991 and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful. The ink supply and circulation system of the FIG. 1 apparatus includes various ink conduits (i.e. lines) which form an ink recirculation path between the print head assembly and ink supply 8.

Referring now to FIGS. 3–5, the stimulation system embodiment in accord with the present invention is further illustrated. As most easily seen in FIG. 3, the stimulation system comprises four major elements: the orifice plate 25, the manifold tube 51 and transducers 54, 55, which are predeterminedly configured in a simple and compact assembly. The orifice plate 25 is formed as a generally rectangular plate, e.g. of electroplated nickel and has generally planar face surfaces on its upper and lower sides (as viewed in FIG. 3). Along a central longitudinal axis, denoted by dotted lines A in FIG. 3, a linear array of orifices extend through the orifice plate from the top to bottom sides. Preferred detail constructions of such orifice plates are described below with reference to FIGS. 6 and 7.

The manifold tube 51 comprises a rigid tube, e.g. formed of brass, and has an inlet end **51*a*, an outlet end 51*c* and a central section 51*b* with an open lower sector that is attached to the top side of the orifice plate 25, e.g. by solder 58 (see FIG. 4). The rigid ends 51*a* and 51*c* are mounted to the printer housing to support the stimulation system assembly in the printer in a location such as shown in FIG. 2, above the charge plate 26, catcher 27** and the print zone.

Transducer members 54, 55 are attached e.g. with epoxy 59 to the longitudinal side edges of the orifice plate 25 and are substantially equidistantly spaced from the longitudinal array axis A. In one preferred construction the transducer members comprise symmetrical, rectangular piezoelectric crystal strips that extend normally upward from the edges of the top surface of orifice plate 25. The transducer members are constructed to expand and contract along their width axes (i.e. toward and away from the orifice plate edges) when subjected to applied voltages (note arrows D in FIG. 3). The 90° angle created by the normal orientation of the transducers 54, 55 is not critical but is preferred to maximize the displacements to the orifice plate edges. The electrical leads 64, 65 are coupled to opposite surfaces of the transducer members in a well known manner and the leads and the upper ends of the transducers are potted, e.g. in an epoxy wall 67 to provide insulation. The wall 67 is attached to the printer housing and thus creates a backing plate that directs the expansion energies from the transducers 54, 55 downwardly to the orifice plate edges.

Operation of the stimulation system just described commences e.g. over a home station 9 such as shown in FIG. 1, and ink is supplied from the reservoir 8 to flow through the manifold tube 51 from inlet 23 to outlet 29. Ink streams will issue from the orifice array as shown in FIGS. 4 and 5 and the pulse generator 70 is activated to provide series of in phase voltage pulse trains to energize the transducers 54 and 55 so that they will expand and contract in unison. The pulse train has a frequency selected to flex orifice plate at the desired drop frequency. That is, the pulse train frequency will have approximately a 1:1 ratio to the desired drop frequency; however, there is a phase shift between the pulse train and the drop streams.

More specifically, the rigid coupling of the central tube portion **51*b* to the orifice plate, together with the reduced orifice plate central axis thickness (created e.g. by the orifice openings) have been found to cooperate with the symmetrical forces exerted by the transducers 54, 55 to cause the plate 25** to flex (symmetrically with respect to the longitudinal axis A) between convex and concave conditions (or if desired between planar and convex or concave conditions). This periodic flexure has been found to impose highly effective synchronous control of the ink stream breakup so that a plurality of in-phase droplet streams of uniformly sized and spaced ink droplets are provided.

In operating the stimulation system just described, I have discovered that the frequency of the pulse train can be selectively varied over a wide range to correspondingly vary the droplet stream frequency. This is highly useful in allowing a flexible servoing of the printing operation to a change in print media feed rate. Moreover, I discovered that varying pulse train frequency between significantly different ranges effects a major shift in the droplet size. For example, varying the pulse train frequency from 50 KHz to 90 KHz has been observed to change the size of the ink drops from about 6 mils to about 3 mils in diameter. This change occurs while still maintaining synchronous drop generation. Thus the present invention provides for a printer, the capability to print with variable drop sizes. This capability is useful, e.g. for changing output modes of the printer (high resolution to lower resolution) or for printing on the same media with different resolutions, e.g. by separate passes of the same print sheet with different operating frequencies.

Figure 6:
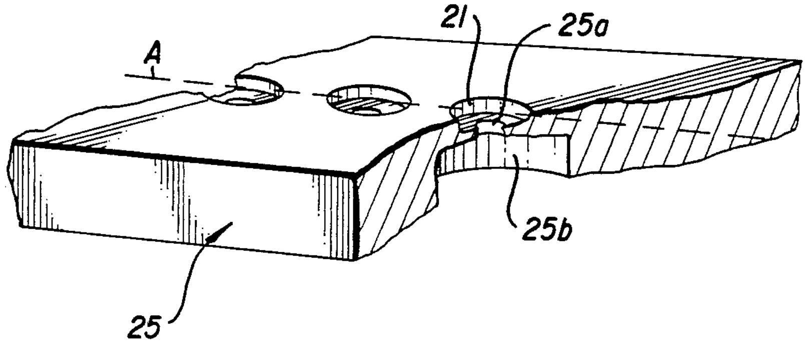
FIG. 6 is a perspective view of a portion of one orifice plate construction useful in the present invention.
Figure 7:
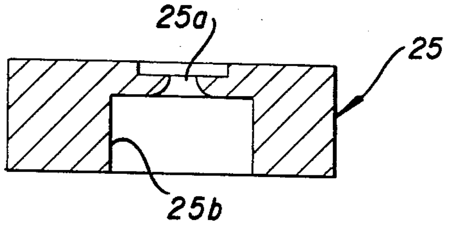
FIG. 7 is a cross section view of the FIG. 6 orifice plate construction.

FIGS. 6 and 7 show one preferred embodiment of orifice plate for use in the present invention; however, various other configurations are useful. Thus, the orifice plate 25 comprises an array of openings **25*a* (along the central longitudinal axis A of the orifice plate) that define the stream egress and a plurality of recesses 25*b* on the orifice plate inlet side. The fabrication of an orifice plate such as shown in FIGS. 6 and 7 is described in detail in U.S. Pat. No. 4,184,925. The recesses 25*b*** can also be formed as a continuous slot or other pattern to assist in defining the axis of flexure for the orifice plate.

The invention has been described in detail with particular reference to preferred embodiments thereof, but it will be understood that variations and modifications can be effected within the spirit and scope of the invention.

I claim:

1. In a continuous ink jet printer apparatus of the kind having an ink reservoir and supply and return conduits for circulating ink to and from a print head, an improved upper print head assembly comprising:

(a) print head conduit means mounted in said printer so as to extend along a linear path through the drop ejection region thereof, said conduit means having a manifold opening proximate said drop ejection region;

(b) a generally rectangular and planar orifice plate having a linear array of orifices formed along a central axis there of, said orifice plate being attached to said conduit means with said orifice array aligned along said linear path and in liquid communication with said manifold opening;

(c) a pair of piezoelectric transducer elements respectively attached to spaced linear sections of said orifice plate that are substantially equidistant from and parallel to said linear orifice array, said transducer elements each extending generally normally from said orifice plate plane to locations of attachment to said printer and being constructed to expand and contract in unison in the directions perpendicular to said orifice plate plane; and (d) means for electrically energizing said transducers to alternately expand and contract, whereby said orifice plate alternately flexes to convex and concave configurations about said central axis.

2. In a continuous ink jet printer, an improved drop stimulation system comprising:

(a) a rectangular orifice plate supported at a central longitudinal axis and having a linear array of orifices along said central axis;

(b) first and second electromechanical transducer means, attached to first and second regions of said orifice plate, equidistantly on opposite sides of said central axis, for flexing said orifice plate alternately concave and convex about its central axis;

(c) means for supplying ink under pressure to issue as jets from said orifices; and (d) means for actuating transducer means to stimulate said ink jets at a predetermined frequency.

3. The invention defined in claim 2 wherein said transducer actuating means is selectively variable to adjust the size of ink jet droplets.

* * * * *